United States Patent Office 3,257,225
Patented June 21, 1966

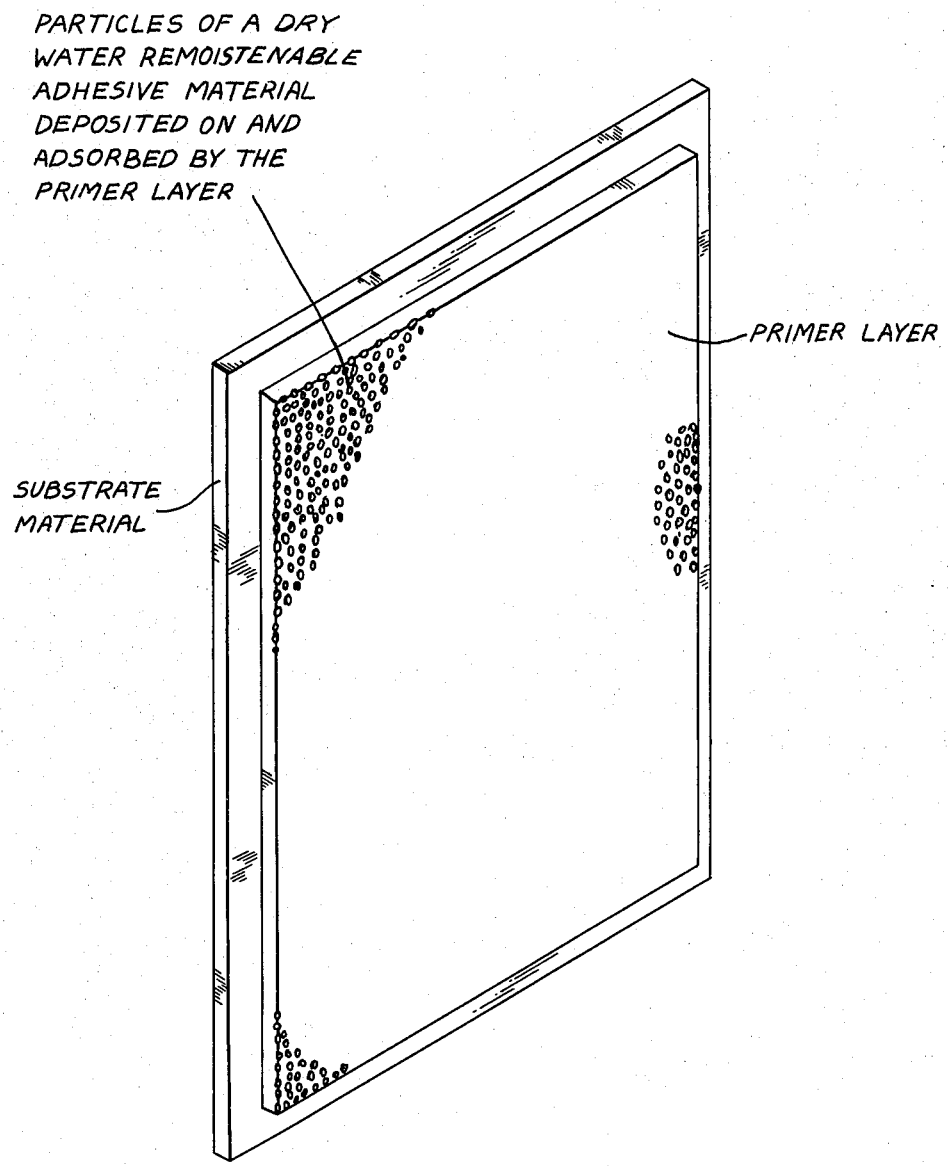

3,257,225
METHOD OF MAKING A REMOISTENABLE ADHESIVE PRODUCT
Carl D. Marotta, Southampton, Pa., and William D. Diana, Plainfield, N.J., assignors to National Starch and Chemical Corporation, New York, N.Y., a corporation of Delaware
Filed Dec. 5, 1961, Ser. No. 157,272
5 Claims. (Cl. 117—33)

This invention relates to water remoistenable films and to a method for producing the same.

So-called remoistenable adhesives are commonly utilized in the production of tapes, labels, wall paper, posters, envelopes and similar products wherein it is desired to provide a dry adhesive film which on being moistened with water will become tacky and thereby allow for the ready adhesion of the thus coated product to a variety of substrates. In the manufacture of remoistenable adhesive products, it is the usual practice to prepare an aqueous solution or dispersion of the dry adhesive material, which is commonly called the "gum." After applying a film of the dispersed gum to a paper substrate, the water is evaporated and the resulting dry, continuous film of gum material will, on being moistened with water, produce the desired tacky, adhesive surface.

In addition to making remoistenable adhesives by the foregoing method, such adhesives have been produced by employing a binder ingredient to bond the gum particles not only to themselves, but also to the paper base. This end is accomplished by mixing remoistenable adhesive particles with a solution of the binder ingredient in a volatile solvent that cannot dissolve the adhesive particles, depositing the mixture onto a paper base, and evaporating the volatile solvent. The adhesive composition produced by this method functions effectively with paper, wood, and other porous substrates.

Difficulties are encountered when it is attempted to apply the above described methods to the manufacture of remoistenable adhesive products having a non-porous substrate. In order to apply a remoistenable adhesive to a non-porous substrate, the binder constituent of the formulation must show specific adhesion to the substrate surface. In addition, it is necessary in such formulations to employ a high proportion of binder material in relation to the amount of remoistenable adhesive in order to obtain an effective bond between the adhesive composition and the non-porous substrate. Since binders having specific adhesion to non-porous surfaces do not exhibit a high degree of remoistenability, it is apparent that a formulation incorporating the large proportion of non-remoistenable adhesive necessary to promote adhesion to a non-porous substrate would necessarily include only a small amount of remoistenable adhesive. It is manifest, therefore, that the methods employed to prepare remoistenable adhesive products embodying porous substrates are ineffective in the preparation of remoistenable adhesives which are to be applied to non-porous substrates.

It is an object of this invention to provide a method of producing remoistenable adhesive products having non-porous substrates. It is another object of this invention to provide an effective and economical method of producing remoistenable adhesive products. A further object of this invention is to provide remoistenable adhesive products having excellent properties of dimensional stability and resistance to delamination. Other objects and the advantages of this invention will be apparent from the following description.

In accordance with the invention, a layer of a suitable liquid primer composition is applied to a substrate and while said primer composition is still moist or wet, particles of a dry remoistenable adhesive material are deposited onto the surface of the primer layer. Upon being thus deposited on the moist primer, the particles of remoistenable adhesive material are adsorbed by the latter without any solution occurring. The result is thus a product having a surface layer of remoistenable adhesive material. Residual solvent may then be removed from the formulation without the necessity of any prolonged drying or heating. The process of this invention therefore yields a product consisting of a substrate, a layer of primer, and a surface layer of remoistenable adhesive material, wherein said remoistenable adhesive material is adsorbed on the surface of the primer layer. It is also within the scope of this invention to include adhesive products wherein the uncoated surface of the substrate is joined to a similarly uncoated substrate surface in order to form products having double-faced remoistenable surfaces.

The product of the invention is shown in the appended drawings.

As was mentioned hereinabove, the primer is applied to a suitable substrate. Any of the conventional coating means available to the practitioner can be utilized to deposit the primer coating upon the substrate. For the purposes of this invention, the composition of the primer used is not critical. However, it must show adhesion to the substrate and should not dissolve the remoistenable adhesive which must be able to form a surface layer upon the wet primer. The primer may, for example, be a lacquer or an aqueous based system. Primers having solids contents ranging from about 10% solids to about 100% solids, as in the case of hot melts, can be readily employed in this invention. Although it is desirable to employ a primer having as high a solids content as possible, it usually is the practice to use primer compositions having a solids content of from about 10% to about 60%. Similarly, coating weights of from about 2 to about 4 pounds of primer per ream of substrate have been applied in a wet thickness of from about 0.3 to about 1.0 mils, thereby resulting in primer coatings of from about 0.1 to about 0.4 mils thickness. Although the aforementioned coating weights have produced the most satisfactory results, the use of coating weights beyond these limits may also, in some cases, result in primer coatings having effective adhesive properties. Thus, when non-flexible substrates, such as those utilized in vinyl imitation supports and polystyrene wall shelves, are employed, the thickness of the primer layer may vary from about 1.0 mils to about 3.0 mils.

The scope of the present invention comprehends the use of porous and non-porous materials as the substrate for the primer layer. As was indicated previously, non-porous substrates have presented a particular problem with respect to obtaining a primer composition having strong adhesion to such substrates which would also be capable of adsorbing a sufficient amount of remoistenable adhesive material. The process of the present invention is, in fact, applicable to a wide variety of non-porous substrates. Thus, among the non-porous substrates which may be utilized are included the films derived from synthetic resins such as polyvinyl halides, polyvinylidene halides, polyalkyl acrylate esters, polyolefins, polyesters, polyamides, polyfluorovinyls, polyfluorohalovinyls, and the like; metallic foils such as those derived from aluminum, copper, and the like; the films derived from cellulosic resins such as cellulose acetate, cellulose propionate, cellulose butyrate, and cellophane, as well as various other non-porous materials, the most noteworthy of which is glass. The process of this invention is also, of course, applicable to porous substrates, including paper, wood, paper board, Masonite, and the like.

As was indicated previously, it is necessary, for the purposes of this invention, that the primer exhibit adhesion to the substrate and that it does not act as a solvent for the remoistenable adhesive to be deposited thereon. The composition of the primer used with a particular substrate is not critical to our process, and any primer formulation can be used if it adheres to the substrate and if it adsorbs the remoistenable adhesive so as to allow for the formation of a surface layer of said adhesive. Thus, for example, with substrates of polyethylene glycol terephthalate film or metallic foil, primers may be chosen from among urethane adhesives, polyvinyl acetate emulsions or lacquers, acrylic emulsions or lacquers, epoxy resins, blends of phenolic resins and rubber latices, butyl rubber cements, butadiene styrene cements, butadiene-acrylonitrile cements, and similar materials; for polyvinylidene chloride film substrates, use may be made of such primers as polyvinyl acetate, polyvinyl chloride, butadiene-styrene cements, butadiene-acrylonitrile cements, and like materials; for cellulosic films such as cellophane and similar films, primers may be chosen from rubber cements, acrylic emulsions, polyvinyl acetate emulsions, and the like; for substrates derived from vinyl resinous films, rubber cements, urethane adhesives, acrylic emulsions, polyvinyl acetate emulsions, and like materials may be selected as primers. Thus, it may be noted that all of the above listed primers may be described as high molecular weight polymeric materials. It should be mentioned that the foregoing list is not intended to be exhaustive but is merely exemplary of the considerably varied number of substrates and primers that can be used in the process of our invention. It should also be mentioned that the thickness of the primer layer can vary according to the needs of the specific system that is being employed.

The remoistenable adhesive used in our invention is applied to the primer film while the film is still wet. The remoistenable material is adsorbed on the surface of the primer film, thereby enabling a strong bond to be formed between the adhesive material and the primer. A roller or similar means of applying pressure may be employed to press the remoistenable material into the primer coating, thereby securing a firmer anchorage of the material to the coating. Thus, if a primer with residual tack properties is dried thoroughly and then dusted with a dry remoistenable adhesive material, the latter may be anchored to the primer layer by such application of pressure. It is to be noted that, in our process, the remoistenable adhesive is added directly without the added expense and processing that the use of a vehicle for the adhesive would entail. Excess remoistenable material may be removed from the surface of the primer film by any conventional method, such as wiping, scraping, vibrating or blowing. The thickness of the layer of the remoistenable adhesive is not critical to our invention and it is within the scope of our invention to include layers of adhesive varying in thickness according to the different requirements of the particular system being utilized.

The material which is to be used as the remoistenable adhesive in the process of our invention may be selected from among a variety of adhesive materials. It is necessary only that said adhesive be adsorbed on the surface of the primer film and that, when moistened with water, it should become tackified. Among the materials that may be employed as the remoistenable adhesive are included: natural gums, such as seaweed extracts, gum arabic, gum tragacanth, locust bean gum, and the like; starches such as corn, high amylose corn, sago, wheat, rice, sweet potato, sorghum, waxy sorghum, waxy maize, potato or tapioca, as well as components of these starches, such as amylose or amylopectin, and the conversion products and derivatives of the afore-mentioned starches such as starch ethers, starch esters, dextrines, and the like. The starches and starch derivatives mentioned hereinabove must be water soluble or water remoistenable. These characteristics may be effected either by pregelatinization or by the method used to produce the starch derivative. Also applicable for use as remoistenable adhesives are cellulose derivatives, such as methyl cellulose, carboxymethyl cellulose, carboxyethyl cellulose, hydroxyethyl cellulose, and the like; synthetic resins such as polyvinyl alcohol, polyacrylamide, polyethylene oxide, polyvinyl pyrollidone, vinyl pyrollidone-vinyl acetate copolymers, polyvinyl acetate, crotonic acidvinyl acetate copolymers, and the like; and proteinaceous materials such as animal glue, casein, zein, and the like. In effect, any remoistenable adhesive material that is not dissolved by the primer layer can be employed in the present invention.

The properties of the remoistenable adhesive material may be altered or modified by the addition of suitable chemical reagents, such as borax, sugar, salts, urea, preservative agents, wetting agents, and similar additives. It is necessary for the purposes of this invention that such modification does not eliminate the remoistenable property of the adhesive nor render the adhesive soluble in the primer layer.

The amount of remoistenable adhesive solids which is used, relative to the amount of primer solids present, will depend on the size of the remoistenable adhesive particles. Satisfactory coatings have been obtained by using from about 4 to about 10 parts of remoistenable material to about 1 part of primer. Coating weights of from about 6 to about 16 pounds of remoistenable adhesive per ream of substrate, resulting in adhesive layers of from about 0.5 to about 1.0 mil thickness, have produced the most satisfactory results. The remoistenable adhesive may be ground to any desired particle size by conventional grinding mills or other suitable means prior to its placement onto the primer layer.

The remoistenable adhesive products obtained by the process of our invention can be used in a variety of applications. So-called "lay flat" gummed papers commonly used in preparing labels, decals, wallpaper, and similar products are particularly suitable for manufacture by our method. Moreover, our process is applicable to products having non-porous bases, as well as to those embodying paper or other porous bases. Any item embodying a remoistenable adhesive film as a constituent, for example, labels, decals, wall coverings, outdoor posters, tapes, envelopes and the like, can be produced by means of our process.

The following examples, in which all parts given are by weight unless otherwise noted, will further illustrate the embodiment of our invention.

EXAMPLE I

This example illustrates the use of various substrates, primers, and remoistenable adhesives in the process of our invention.

The following procedure was followed, with some variation, in each formulation given in this example.

In this basic procedure, the primer formulation was first prepared and then coated upon a substrate. The remoistenable adhesive material was then deposited on the wet primer coating, and the primer coating with the remoistenable adhesive particles adsorbed thereon was then subjected to a drying operation.

(a) Onto a film of polyethylene glycol terephthalate there was coated a 0.5 mil layer of a primer composition comprising a 20% solids ethyl acetate solution containing 10% by weight of a phenolic resin (non-heat reactive, oil soluble resin, Softening point=250°—280° F., Specific gravity=1.03–1.05) and 10% by weight of a butadiene-acrylonitrile copolymer. British gum dextrine particles (7 lbs. per ream of substrate) were then deposited upon the wet primer layer. The resulting product was dried at 140° F. for 1 minute. Excess dextrine particles were removed from the surface, leaving a layer of remoistenable adhesive which became tacky on being moistened with water.

(b) The procedure of Example I (a) was followed with the exception, in this case, that various other substrates were employed, namely, aluminum foil, paper, and a cellulose acetate film. As before, a product was obtained which in each instance demonstrated remoistenable adhesive properties.

(c) The procedure of Example I (a) was followed with the exception, in this case, that instead of using British gum dextrine as the remoistenable adhesive, pregelatinized waxy maize corn starch and a carboxymethyl starch ester were each used as the remoistenable material. Products demonstrating remoistenable adhesive properties were again obtained.

(d) In this case a paper sheet was coated, at 300° F., with a 0.5 mil film of a primer hot melt composition comprising:

| Component— | Parts |
|---|---|
| Polyethylene polymer | 50 |
| Polyterpene resin: light colored thermoplastic, melting point=132°–138° F., specific gravity =0.98–1.00 | 30 |
| Polyisobutylene | 15 |
| Polybutylene | 5 |

Pregelatinized waxy maize corn starch (5 lbs. per ream of substrate) was then deposited upon the molten surface of the primer layer and, on being cooled, a product having a remoistenable adhesive surface was obtained.

(e) In this case a paper sheet was coated with a 0.3 mil film of a primer composition comprising:

| Component— | Parts |
|---|---|
| Polyisobutylene rubber | 13.4 |
| Polyterpene resin: light colored thermoplastic, melting point=112°–118° F., specific gravity =0.98–1.00 | 6.6 |
| Hexane | 80.0 |

A pregelatinized British gum dextrine (14 lbs. per ream of substrate) was then dusted upon the wet surface of the primer layer. After drying, a product having a remoistenable adhesive surface was obtained.

(f) In this case, a primer composition comprising a vinyl resinous polymer of the following composition

| Component— | Parts |
|---|---|
| Polyvinyl chloride | 86 |
| Polyvinyl acetate | 13 |
| Polyvinyl alcohol | 1 | was dissolved in a 50:50 methylene:methyl ethyl ketone solvent blend and coated on various substrates, namely, polyethylene glycol terephthalate film, aluminum foil, and polyvinyl chloride film in a coating thickness of 0.3 mil. British gum dextrine (8 lbs. per ream of substrate) was deposited upon the primer layer and the resulting product was dried, yielding a product having a remoistenable adhesive surface.

(g) A cellophane base in this case was coated with a 0.2 mil thick layer of a 20% solids dispersion of polyvinyl acetate in toluene. Solubilized waxy maize corn starch (8 lbs. per ream of substrate) was dusted upon the wet resinous layer and the resulting product was dried, yielding a product having a remoistenable adhesive surface.

(h) In this case 1.0 mil films of polyethylene, polypropylene, and polychlorotrifluoroethylene were each coated with a 0.3 mil layer of a primer composition comprising:

| Component— | Parts |
|---|---|
| Butadiene styrene-butadiene acrylonitrile copolymer | 16.5 |
| Dihydroabietyl phthalate | 4.2 |
| Ketone-aldehyde condensation resin: pale colored, hard resin, acid number=16, melting point=75°–85° C., specific gravity=9.45–9.65 | 12.5 |
| Methyl ethyl ketone | 68.8 |

Solubilized waxy maize corn starch (12 lbs. per ream of substrate) was deposited upon the primer layer while the latter was being dried at 140° F. for 1 minute. A product having a remoistenable adhesive surface and showing good adhesion to porous and non-porous substrates was obtained.

(i) In this case a film of a polyvinyl fluoride resin was coated with a 0.2 mil layer of a primer composition comprising:

| Component— | Parts |
|---|---|
| Polyvinyl acetate-octyl acrylate copolymer | 27.2 |
| Polyvinyl ethyl ether | 12.2 |
| Glycerol ester of hydrogenated rosin: acid number=10, softening point=80°–88° C. | 6.8 |
| Phenolic resin: non-heat reactive, oil soluble resin, softening point=250°–280° F., specific gravity=1.03–1.05 | 6.8 |
| Toluene | 57.0 |

Solubilized waxy maize corn starch (10 lbs. per ream of substrate) was deposited upon the wet primer layer. After drying a product was obtained having a remoistenable adhesive surface.

(j) In this case a film of polyethylene glycol terephthalate was coated with a 0.3 mil thickness of a primer emulsion of the following composition:

| Component— | Parts |
|---|---|
| Polyvinyl acetate-dibutyl maleate copolymer | 69.3 |
| High molecular weight polyester: liquid, acid number=25, specific gravity=1.22 | 21.0 |
| Glycerine | 4.7 |
| Water | 5.0 |

Solubilized waxy maize corn starch (10 lbs. per ream of substrate) was dusted upon the wet primer layer, and after drying, a product having a remoistenable adhesive surface was obtained.

(k) In this case, a sheet of adsorbent white paper was coated with a 0.1 mil thick layer of a 25% solution of polyvinyl acetate in toluene. Solubilized waxy maize corn starch (8 lbs. per ream of substrate) was dusted onto the wet primer layer while the latter was drying. The product was then passed through an oven maintained at a temperature of 200° F. for 30 seconds to remove residual solvent, and excess starch particles were then wiped from the surface of the product. The product obtained had an adhesive surface showing considerable tack on moistening with water.

EXAMPLE II

This example illustrates the incorporation of modifying agents with the remoistenable adhesive material.

Onto a polyvinyl chloride film there was deposited a 0.2 mil thick layer of a 25% solids primer composition in ethyl acetate comprising 10% by weight of a phenolic resin (non-heat reactive, oil soluble resin, Softening point=250°–280° F., Specific gravity=1.03–1.05) and 10% by weight of a butadiene-acrylonitrile copolymer. The following blends of dry remoistenable adhesive (10 lbs. per ream of substrate) were then added to the wet primer layer:

| Component | Blend 1 | Blend 2 | Blend 3 | Blend 4 | Blend 5 |
|---|---|---|---|---|---|
| Carboxymethyl starch | 90 | 98 | 90 | | 95 |
| Polyvinyl alcohol | 9 | | | | |
| Borax | 1 | 2 | | 3 | |
| Spray dried polyvinyl acetate | | | 10 | | |
| Solubilized waxy maize corn starch | | | | 93 | |
| Polyacrylamide | | | | | 5 |

The substrates, after heating at 140° F. for one hour, were cooled to room temperature and wet thoroughly with water. In each case, a product showing satisfactory adhesive properties was obtained.

EXAMPLE III

This example illustrates a modification of the process of our invention, said modification comprising the deposition of adhesive particles on a dry primer surface.

Onto a film of polyethylene glycol terephthalate there was coated a 0.3 mil thick layer of a 20% solids dispersion, in toluene, of a 50:50 vinyl acetate:octyl acrylate copolymer. The primer coating was dried thoroughly, resulting in a layer having residual tack properties. Solubilized waxy maize corn starch (12 lbs. per ream of substrate) was then dusted onto the primer layer, and a roller was passed over the surface of the primer layer in order to increase anchorage of the starch particles to the film. On moistening with water, the film showed tacky characteristics.

Any departure from the above description which conforms to the present invention is intended to be included within the scope of this invention as defined by the following claims.

We claim:
1. A method of making water remoistenable adhesive products which comprises depositing a layer of a liquid primer composition upon a substrate and, while said layer of primer composition is still in a particle adsorbable state, depositing thereon particles of a dry water remoistenable adhesive material, said water remoistenable adhesive material being insoluble in said primer composition and being adsorbed on the surface of said layer of primer composition; said adsorbed particles of water remoistenable adhesive material being thereafter allowed to remain permanently upon the surface of said layer of primer composition.

2. The method of claim 1 wherein the layer of primer composition is still moist when the particles of the water remoistenable adhesive material are deposited thereon, and wherein the moist primer layer with the deposited particles of water remoistenable adhesive material is subsequently dried.

3. A method of making remoistenable adhesive products which comprises depositing a layer of a liquid primer composition upon a substrate, drying said layer of primer composition, thereby resulting in a layer of primer composition having residual tack properties, thereafter depositing particles of a dry water remoistenable adhesive material on the surface of said layer of dry primer composition, said water remoistenable adhesive material being insoluble in said primer composition, and thereupon pressing the water remoistenable adhesive material into said layer of primer composition, thereby forming an adsorbed layer of water remoistenable adhesive material on the surface of said layer of primer composition; said adsorbed layer of water remoistenable material being thereafter allowed to remain permanently upon the surface of said layer of primer composition.

4. The method according to claim 1 wherein said substrate is a non-porous material and wherein said primer composition is a high molecular weight polymeric material.

5. The method according to claim 1 wherein said substrate is a porous material and wherein said primer composition is a high molecular weight polymeric material.

References Cited by the Examiner

UNITED STATES PATENTS

| | | | |
|---|---|---|---|
| 1,815,444 | 7/1931 | Moss | 156—283 |
| 2,300,224 | 10/1942 | Humphner | 161—167 |
| 2,477,344 | 7/1949 | Neumann | 117—122 |
| 2,577,821 | 12/1951 | Smith et al. | 117—122 |
| 2,596,179 | 5/1952 | Seymour | 154—53.5 |
| 2,746,881 | 5/1956 | Wegener | 117—76 |
| 2,768,923 | 10/1956 | Kepple et al. | 156—279 X |
| 2,991,217 | 7/1961 | Schmidt et al. | 156—279 X |
| 3,034,944 | 5/1962 | Chipman | 117—122 |

EARL M. BERGERT, *Primary Examiner.*

R. I. SMITH, M. L. KATZ, *Assistant Examiners.*